United States Patent [19]

Uva

[11] 4,111,875

[45] Sep. 5, 1978

[54] COMPOSITION OF HEEL BASE FOR SHOES

[76] Inventor: Pasquale A. Uva, 248 South St., Holbrook, Mass. 02343

[21] Appl. No.: 659,683

[22] Filed: Feb. 20, 1976

[51] Int. Cl.$^2$ .............................................. C08K 5/10
[52] U.S. Cl. ................................ 260/23 R; 36/34 A; 36/35 A; 260/42.52; 260/897 B
[58] Field of Search ............. 260/42.52, 897 B, 23 R, 260/42.37; 36/35 A, 34 A

[56] References Cited

U.S. PATENT DOCUMENTS

| 3,050,877 | 8/1962 | Ronci | 36/34 A |
| 3,248,359 | 4/1966 | Maloney | 260/897 B X |
| 3,652,521 | 3/1972 | Abend | 260/42.52 X |
| 3,941,859 | 3/1976 | Batiuk et al. | 260/42.52 X |

Primary Examiner—Sandra M. Person
Attorney, Agent, or Firm—Morse, Altman, Oates & Bello

[57] ABSTRACT

In a shoe construction, effective chemical bonding rather than nailing of a lower rubber heel to an inner heel base is enabled by the chemical composition and surface conditioning of the latter. The chemical composition is characterized by a mixture of a polyethylene, an ethylene vinyl copolymer, a filler, and a dessicant in particular proportions. The surface conditioning is characterized by an oxidizing flame treatment.

11 Claims, 5 Drawing Figures

U.S. Patent     Sept. 5, 1978     4,111,875
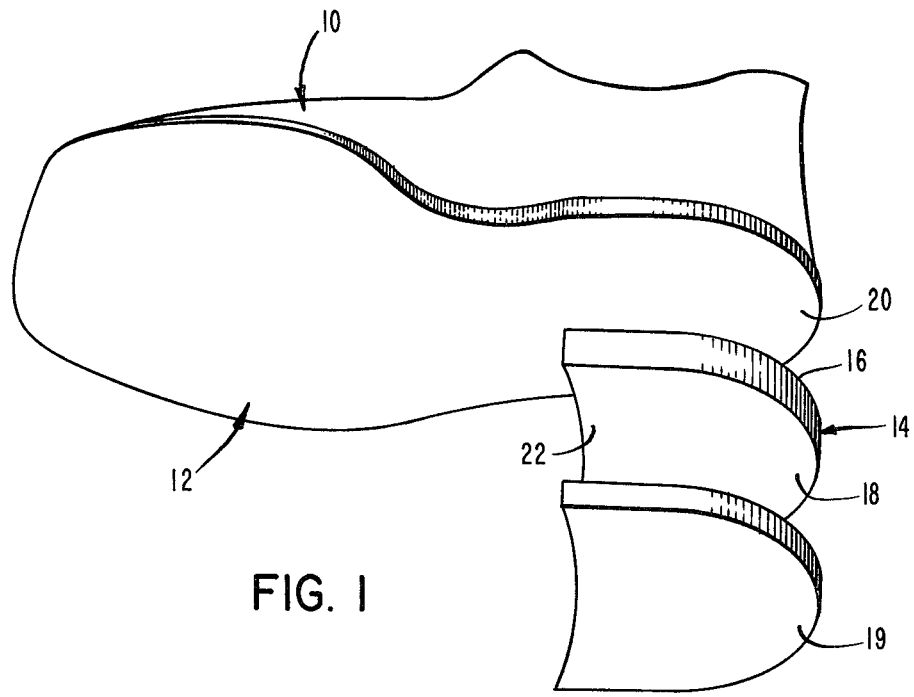
FIG. 1
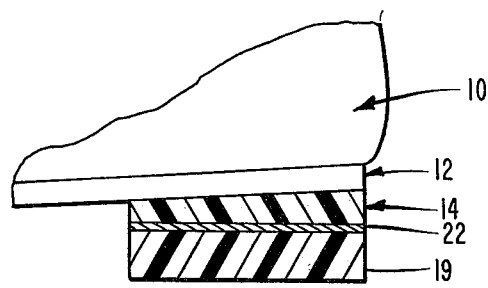
FIG. 2
      
FIG. 3       FIG. 4       FIG. 5

COMPOSITION OF HEEL BASE FOR SHOES

BACKGROUND OF THE INVENTION

1. Field of the Invention

The present invention relates to shoe constructions and compositions of their components and, more particularly, to a shoe construction in which a heel base is interposed between an upper shoe body and a lower rubber heel or lift (i.e. a thin heel).

2. The Prior Art

Conventionally, the heel base, which may be composed of polyethylene, is nailed to the shoe body and the rubber heel is nailed to the heel base. In such cases, it is desired to eliminate the expense of nailing, the tendency of nails to protrude from the heel, and the tendency of gap formation between the heel and the heel base when joined by nailing and when the heel is partially worn.

SUMMARY OF THE INVENTION

The primary object of the present invention is to provide, for incorporation into a shoe construction, a heel base of specific chemical composition and specific surface conditioning that enable a rubber heel or lift to be cemented thereto. The chemical composition is characterized by the combination of a polyethylene, an ethylene vinyl acetate copolymer, a filler, and a dessicant in particular proportions. The surface conditioning is characterized by an oxidizing flame treatment. The composition has minimum porosity so that this heel base suffers from fewere rejects and trims and buffs more efficaciously than prior polyethylene heel bases. The flame treated surface of this heel base is mechanically and chemically primed and activated by the formation of mechanically open and chemically active sites so as to enhance adhesive qualities.

Other objects of the present invention will in part be obvious and will in part appear hereinafter.

The invention accordingly comprises the product and composition hereof, together with their parts, components and interrelationships, which are exemplified in the present disclosure, the scope of which will be indicated in the appended claims.

BRIEF DESCRIPTION OF THE DRAWINGS

For a fuller understanding of the nature and objects of the present invention, reference is made to the following specification, which is to be considered in connection with the accompanying drawings, wherein:

FIG. 1 is an exploded perspective view of the components of a shoe undergoing an assembly process of the present invention;

FIG. 2 is an exaggerated, cross-sectional view of a part of the resulting shoe asemblage;

FIG. 3 is a cross-sectional view of a heel base embodying the present invention;

FIG. 4 is a cross-sectional view of a contoured heel base embodying the present invention; and FIG. 5 is a cross-sectional view of a contoured and tapered heel base embodying the present invention.

DETAILED DESCRIPTION OF A PREFERRED EMBODIMENT

Generally, FIG. 1 illustrates an assembly of shoe components and FIG. 2 illustrates features of a final shoe product, in accordance with the present invention. As shown, the assembly involves the assembly of a shoe from components, including: an upper 10 and a sole 12 extending from toe to heel of upper 10; a heel base 14 that is conventionally shaped with a curved upper face 16 and a flat lower face 18, and a profile having a straight or slightly curved front edge, essentially straight side edges, and a curved rearward edge, this heel base being composed of a formulation in accordance with the present invention; and a heel lower 19 in the form of a rubber heel or lift of the same general peripheral shape as the heel base; the heel base being affixed to the heel portion through sole 12 and into portions of upper 10 by nails at 20; and the heel lower being bonded to the heel base by an interposed layer or layers of cement 22, which are applied originally to both of the contiguous surfaces bonded thereby. Various embodiments of heel base 14 are shown in FIGS. 3, 4 and 5. FIG. 3 shos a thin heel base with flat upper and lower faces and a peripheral rib extending along the side and back edges. FIG. 4 shows a cupped heel base with a reentrantly curved upper face and a flat lower face. And FIG. 5 shows a cupped heel base with a reentrantly curved upper face that tapers forwardly toward a flat lower face. Each cross section is taken along a longitudinal line midway between the side edges of the heel base.

In accordance with the present invention, the composition of heel base 14, for good results, has the following formulation:

|  | Total % by weight |
|---|---|
| An ethylene vinyl acetate copolymer such as ethylene vinyl acetate | 8 to 85 |
| An olefin homopolymer such as polyethylene | 5 to 25 |
| Processing lubricant | 0 to 2 |
| Filler | 10 to 60 |
| Internal lubricant | 0 to 5 |
| Dessicant | 1 to 25 |

The foregoing components are blended in a high shear intensive mixer (such as a Banbury mixer) at a suitable temperature ranging from 100° to 400° F and the resulting blend then is further comminuted into granules or pellets in appropriate comminuting equipment.

The heel base of the present invention then is formed by injection of a melt of the foregoing at from 300° to 500° F into the heel-base-shaped cavity or cavities of a mold that is kept at an appropriate temperature, e.g. room temperature, by refrigerated or room temperature circulating water. Preferred details of the foregoing components are as follows.

Preferably, the copolymer and homopolymer, based on their own total weight, include from 15 to 30% vinyl acetate constituent and from 85 to 70% polyethylene constituent. The processing lubricant is a low molecular weight polyethylene such as that sold under the trade designation DFDA-0053 by Union Carbide. The filler is a mineral powder or mixture of mineral powders, for example: a siliceous material such as silicon dioxide, kaelin clay or calcium silicate; a carbonaceous material such as magnesium carbonate, calcium carbonate or carbon black; or an oxidic material such as titanium dioxide or one of the oxygen containing materials referred to previously. The internal lubricant, for example stearic acid, is a dispensing agent for certain fillers. The dessicant, which should weigh at least 3 times as much as available free moisture in the formulation, typically is calcium oxide. Preferably the homopolymer ranges in specific gravity from 0.941 to 0.965. It is believed that all the component materials contribute to processing and filler acceptance and provide sufficient nail holding characteristics, dimensional stability, resilience, and cementability of the resulting heel base.

The flame treatment of the lower face of the heel base involves exposure of this face to the oxidizing portion, i.e. the outer cone portion, of a high temperature or blue gas flame for the brief period necessary to cause chemical change and slight surface roughness. The bonding material for adhering the rubber heel to the heel base is a neoprene solvent cement, sold by Compo Industries, Inc. under the trade designation 5134 M Neoprene adhesive.

The following non-limiting examples further illustrate the present invention.

EXAMPLE I

A preferred heel base composition of the present invention was formulated as follows:

| | Percentage By Total Weight |
|---|---|
| (1) Copolymer of vinyl acetate and polyethylene sold by Monsanto under the trade designation Santogum # 1050 | 11.50 |
| Copolymer of polyethylene and vinyl acetate sold by duPont under the trade designation Alathon # 3170 | 40.30 |
| Copolymer of polyethylene and vinyl acetate sold by duPont under the trade designation Alathon # 3190 | 12.96 |
| High density polyethylene having a specific gravity of .954 | 9.30 |
| Low molecular weight polyethylene lubricant sold by Union Carbide under the trade designation DFDA-0053 | .93 |
| Carbon black | 18.50 |
| Stearic acid | .56 |
| Mixture of (1) 80% calcium oxide sold by Basic Chemical under the trade designation Desical-p and (2) 20% high flash point hydrocarbon oil | 5.95 |
| Total | 100.00 |

EXAMPLE II

Men's sized heel bases, each approximately ½ to ⅝ inch thick, were produced by injection molding at 400° F. These heels were flame treated (one face each) and then aged at random, both face-to-face in stacks and independently for a period of 7 weeks at 120° F. After aging, half of the heels were bonded to standard composition SBR rubber heel lifts and half of the heels were bonded to 2 × 6 inch strips of cotton tape. The bonding agent in the case of the rubber heel lifts was one coat of a neoprene cement sold by Compo Industries, Inc. under the trade designation 5134M Neoprene Adhesive. The bonding agent in the case of the cotton tape was two coats of a neoprene cement sold by Compo Industries, Inc. under the trade designation #5142 Neopene Adhesive. Activation temperature of the cement for the heel lifts was 135°–140° F. and activation temperature of the cement for the cotton tape was 160° F. Extremities of the two parts of each of these bonded pairs first were pulled on a tensile tester at a jaw separation of 2 inches per minute, next were aged for one week at 120° F., and finally were pulled again as before. The bonds in all cases were excellent. Pull values averaged from 70 to 90 pounds in the case of the 2 inch strips of cotton tapes and from 115 to 135 pounds in the case of the SBR heel lifts.

Since certain changes may be made in the present disclosure without departing from the scope of the invention hereof, it is intended that all matter shown in the accompanying drawings and described in the foregoing specification be interpreted in an illustrative and not in a limiting sense.

What is claimed is:

1. A heel base having a pair of opposed faces and a plurality of edges,
    (a) said heel base being of a composition consisting essentially of the following ingredients:

| | % by Total Weight |
|---|---|
| ethylene vinyl acetate copolymer | 8 to 85 |
| ethylene homopolymer | 5 to 25 |
| processing lubricant | 0 to 2 |
| filler | 10 to 60 |
| internal lubricant | 1 to 5 |
| dessicant | 1 to 25 |

(b) said ethylene vinyl acetate copolymer and said ethylene homopolymer, based on their own weight, including from 15 to 30% ethylene vinyl acetate copolymer and from 85 to 70% ethylene homopolymer;
   (c) said dessicant weighing at least three times the available free moisture of said composition;
   (d) one of said pair of opposed faces being adapted for affixation to a portion associated with a shoe upper; and
   (e) the other of said pair of opposed faces being mechanically rough and chemically active for enhanced bonding by an adhesive to a heel.

2. The heel base of claim 1 wherein said ethylene homopolymer is high density polyethylene.

3. The heel base of claim 2 wherein said high density polyethylene ranges in specific gravity from 0.941 to 0.965.

4. The heel base of claim 1 wherein said filler is carbon black.

5. The heel base of claim 1 wherein said internal lubricant is stearic acid.

6. The heel base of claim 1 wherein said dessicant contains calcium oxide.

7. The heel base of claim 1 wherein said other of said faces is flat.

8. The heel base of claim 1 wherein said other of said faces is cupped.

9. The heel base of claim 1 wherein processing lubricant is a low molecular weight polyethylene.

10. The heel base of claim 1 wherein said filler is a mineral powder or a mixture of mineral powders.

11. The heel base of claim 1 wherein said internal lubricant is a dispersing agent for said filler.

* * * * *